No. 742,833. PATENTED NOV. 3, 1903.
J. BURPITT.
CANDLE MOLDING APPARATUS.
APPLICATION FILED AUG. 24, 1903.
NO MODEL. 2 SHEETS—SHEET 1.
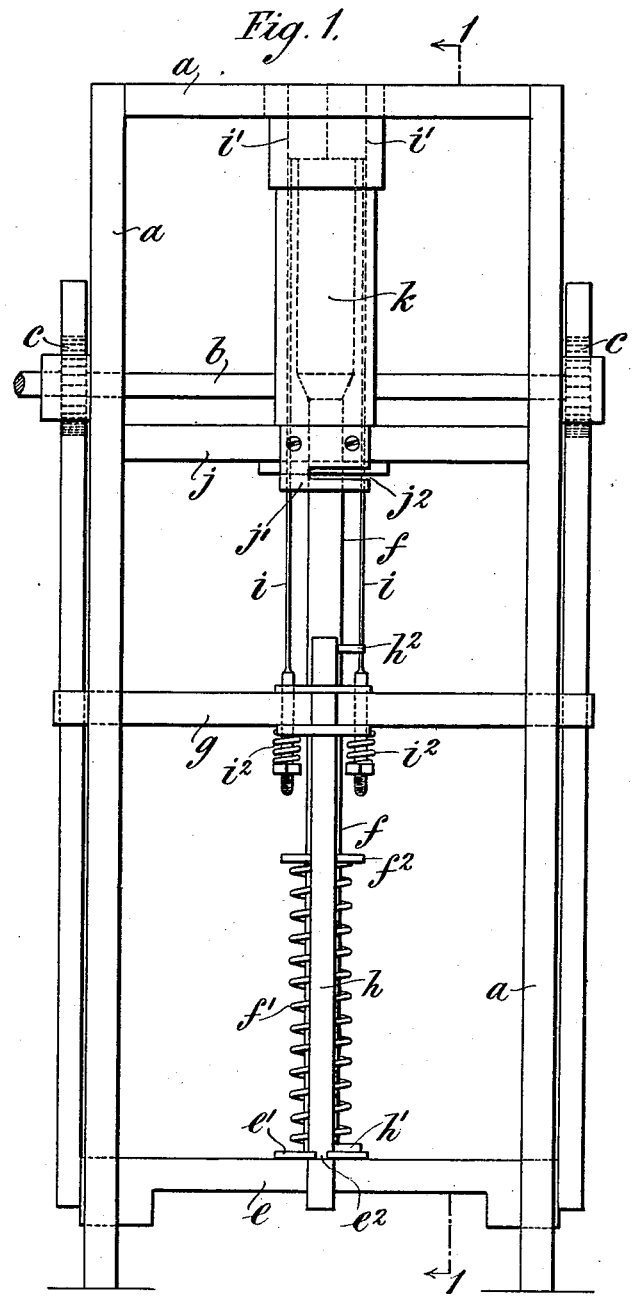
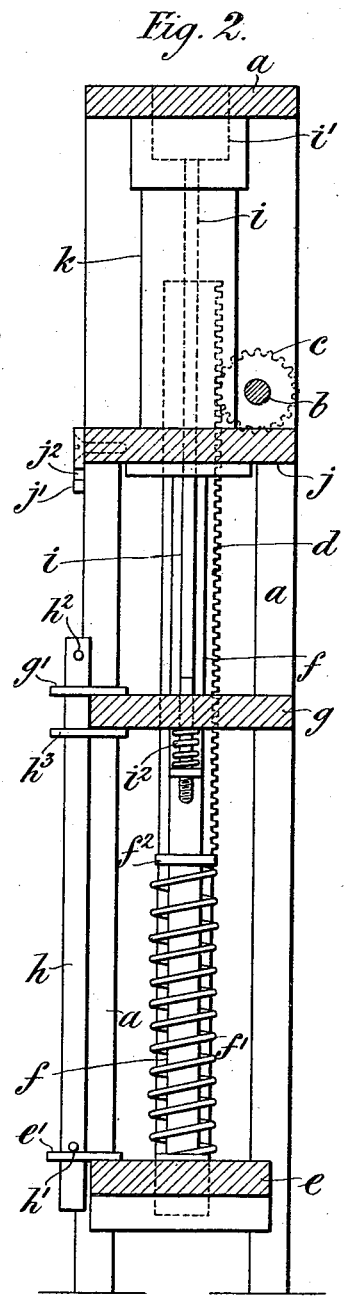
Witnesses.
Inventor.
John Burpitt
By his attorneys
Baldwin, Davidson & Wight.

No. 742,833. PATENTED NOV. 3, 1903.
J. BURPITT.
CANDLE MOLDING APPARATUS.
APPLICATION FILED AUG. 24, 1903.
NO MODEL. 2 SHEETS—SHEET 2.

Witnesses. Inventor:
John Burpitt
By his attorneys
Baldwin Davidson & Wight

No. 742,833. Patented November 3, 1903.

UNITED STATES PATENT OFFICE.

JOHN BURPITT, OF BATTERSEA, ENGLAND.

CANDLE-MOLDING APPARATUS.

SPECIFICATION forming part of Letters Patent No. 742,833, dated November 3, 1903.

Application filed August 24, 1903. Serial No. 170,573. (No model.)

*To all whom it may concern:*

Be it known that I, JOHN BURPITT, candle-maker, a subject of the King of Great Britain, residing at Belmont Works, Battersea, in the county of Surrey, England, have invented certain new and useful Improvements in Candle-Molding Apparatus, of which the following is a specification.

This invention relates to the production of candles with "self-fitting" ends.

According to this invention the portion of the mold in which the self-fitting ends are formed is made in two halves, and to each half is attached a wire, preferably square, working in guides at the side of the mold, these wires being fixed to a plate beneath the tank.

The candles when set are expelled from the molds by the usual "driving-plate" and in their upward movement carry with them the two halves of the portion of the mold forming the self-fitting ends. As the self-fitting ends of the candles leave the mold the two half-molds which form that end are caused to open out, which may be done by means of a "set" in the wires to which they are attached. When they have opened out sufficiently to allow the candles to pass freely into the clamps, their further upward progress is arrested. The halves are drawn back into position again by the driving-plate in its return acting on the plate to which the wires of the cap-molds are attached.

Figure 3:
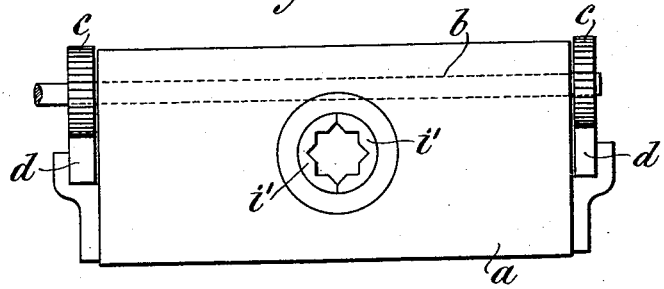
Figure 4:
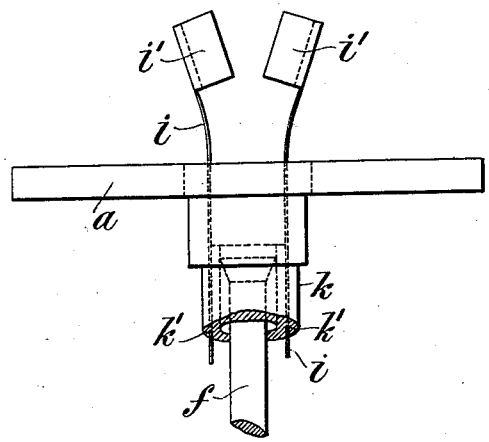
Figure 5:
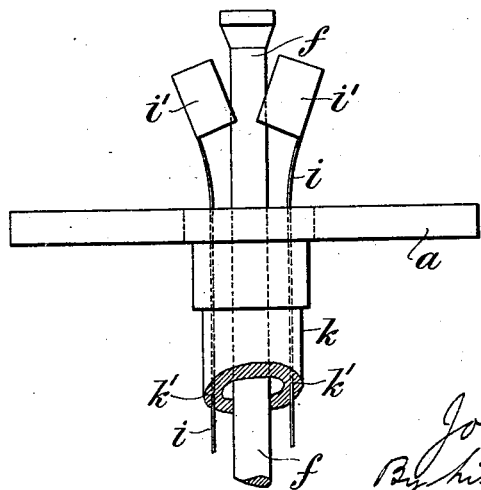

Figure 1 is a front elevation of so much of a candle-molding apparatus as is necessary to show the invention. Fig. 2 is a section on the line 1 1 of Fig. 1. Fig. 3 is a plan. Fig. 4 shows the mold forming the self-fitting end in its raised position, and Fig. 5 shows the candle-ejector in its raised position.

$a\ a$ represent the frame of the apparatus.

$b$ is a shaft extending from one side of the frame $a$ to the other.

$c\ c$ are pinions gearing into racks $d\ d$.

$e$ is the usual driving-plate.

$f$ is a rod carried by the plate $e$, which projects upward through holes in the plate $g$ and mold $k$ and forms the candle-ejector.

$f'$ is a spring surrounding the ejector $f$, which bears against the plate $e$ and the part $f^2$.

$e'$ is a slotted plate in which is formed a slot $e^2$ and carried by the driving-plate $e$.

$h$ is a rod provided with studs $h'\ h^2$ and has attached to it a collar $h^3$. The said rod in the position shown rests with its stud $h'$ upon the plate $e'$ and is supported by a plate $g'$, carried by the plate $g$. The rod $h$ is capable of a movement of rotation. The plate $g$ also carries the wires $i\ i$, to which an outward set is given and to the upward portions of which are attached the divided mold $i'\ i'$ for forming the self-fitting candle end.

$i^2$ represents springs tending to force the lower ends of the wires $i$ downward relatively to the plate $g$.

Depending from the stationary plate $j$, in which is a slot $j^2$, which carries the mold $k$, is a slotted plate $j'$.

The wires $i\ i$ work in guides $k'\ k'$ at the sides of the mold $k$.

The action of the apparatus is as follows: The mold is filled with the composition forming the candle from the usual tank, (not shown in the drawings,) and the apparatus is in the position shown. In order to eject the finished candle, the pinions $c\ c$ are rotated by any means. These gearing with the racks $d\ d$ raise the driving-plate $e$, which lifts the ejector $f$ and also, by means of the plate $e'$ and pin $h'$, the rod $h$, and therefore also the plate $g$ by means of the collar $h^3$ and plate $g'$, the wires $i\ i$, and divided mold $i'\ i'$. The divided mold and ejector will now be in the position shown in Fig. 4—*i. e.*, with the candle freed from the half-molds—and the pin $h^2$ will be on a level with the slot $j^2$ in the plate $j'$. The rod $h$ is now given by hand a quarter-turn, thereby causing the pin $h'$ to register with the slot $e^2$ in the plate $e'$ and the pin $h^2$ to engage with the slot $j^2$ in the plate $j'$. The driving-plate $e$ will now be freed from the pin $h'$, and its further movement will therefore move the ejector $f$ against the action of the spring $f'$, the plate $e'$ moving freely up the rod $h$, and when in the position shown in Fig. 5 the candle will be ejected. The pinions are now left free from their driving mechanism and the spring $f'$, and the weight of the parts will cause the plate $e$ to be moved downward until in the position shown in Fig. 4. It is now necessary to give the rod $h$ a quarter-turn, thereby freeing the pin $h^2$ from the slotted plate $j'$ and causing the pin $h'$ to again rest against the plate $e'$. The parts are now able to return into the position shown in Figs. 1 and 2, and the apparatus will now be ready to eject another candle.

What I claim is—

1. The combination of a candle-mold, a divided mold for forming the self-fitting ends, and a driving-plate, means for first freeing the candle end from the divided mold, and means for subsequently ejecting the candle from the candle-mold.

2. The combination of a candle-mold, a divided mold for forming the self-fitting ends, and a driving-plate, means operated by the driving-plate for lifting the divided mold out of the mold, means for first freeing the candle end from the divided mold, and means for subsequently ejecting the candle from the candle-mold.

3. The combination of a candle-mold, a divided mold for forming the self-fitting ends attached to wires having an outward set, and a driving-plate, means operated by the driving-plate for lifting the divided mold out of the mold and for subsequently ejecting the candle from the candle-mold.

4. The combination of a candle-mold, a divided mold for forming the self-fitting ends, and a driving-plate, a rod raised by the upward movement of the driving-plate for lifting the divided mold out of the candle-mold for first freeing the candle end from the divided mold, and means operated by the driving-plate for subsequently ejecting the candle from the candle-mold.

5. The combination of a candle-mold, a divided mold for forming the self-fitting ends, and a driving-plate, a rod raised by the upward movement of the driving-plate for lifting the divided mold out of the candle-mold for first freeing the candle end from the divided mold, means whereby on the rotation of the rod the driving-plate is free to move further upward without lifting the rod.

6. The combination of a candle-mold, a divided mold for forming the self-fitting ends, and a driving-plate, means of connecting said driving-plate to a rod lifting the divided mold, means for disconnecting same from the rod when in its raised position and for maintaining said rod in its raised position, means for first freeing the candle end from the divided mold, and means for ejecting the candle from the candle-mold by the further upward movement of the driving-plate.

7. The combination of a candle-mold, a divided mold for forming the self-fitting ends attached to wires having an outward set, and a driving-plate, means of connecting said driving-plate to a rod lifting the divided mold, means for disconnecting same from rod when in its raised position and for maintaining said rod in its raised position, and means for ejecting the candle from the candle-mold by the further upward movement of the driving-plate.

8. The combination of a candle-mold, a divided mold for forming the self-fitting ends attached to wires having an outward set, and a driving-plate, a rod raised by the upward movement of the driving-plate for lifting the divided mold out of the candle-mold, and means operated by the driving-plate for subsequently ejecting the candle from the candle-mold.

9. The combination of a candle-mold, a divided mold for forming the self-fitting ends attached to wires having an outward set, and a driving-plate, a rod raised by the upward movement of the driving-plate for lifting the divided mold, and means whereby on the rotation of the rod the driving-plate is free to move further upward without lifting the rod.

10. The combination of a candle-mold, a divided mold for forming the self-fitting ends, and a driving-plate carrying a slotted plate, a rod connecting the said driving-plate with the divided mold for forming the candle end by means of a stud on said rod resting on the said slotted plate, and means operated by the rotation of said rod when the rod is in its raised position of maintaining it thus raised, the said rotation also causing the stud on said rod to coincide with the slot in the slotted plate and thus free the driving-plate for further upward movement.

JOHN BURPITT.

Witnesses:
ALFRED ELIAS MAJOR,
HARRY ARTHUR TUSTIN.